Jan. 25, 1966        J. B. TURNBULL        3,231,315
ANTI-SKID BRAKING SYSTEM
Filed Feb. 3, 1964        2 Sheets-Sheet 2
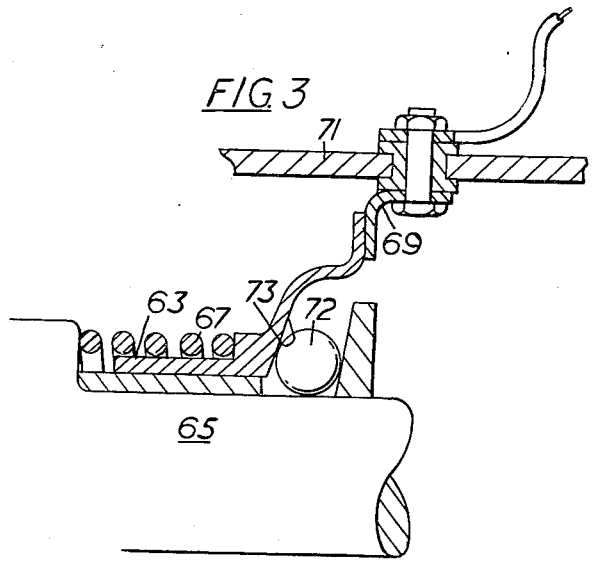
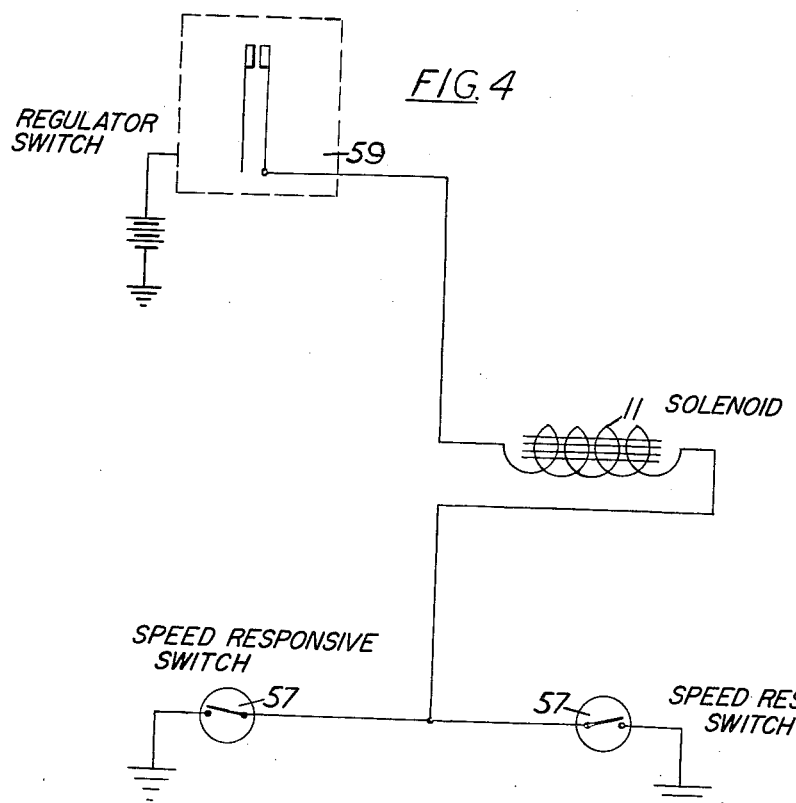
Inventor
JOHN B. TURNBULL
By *John R. Faulkner*
*Clifford L. Sadler*
Attorney

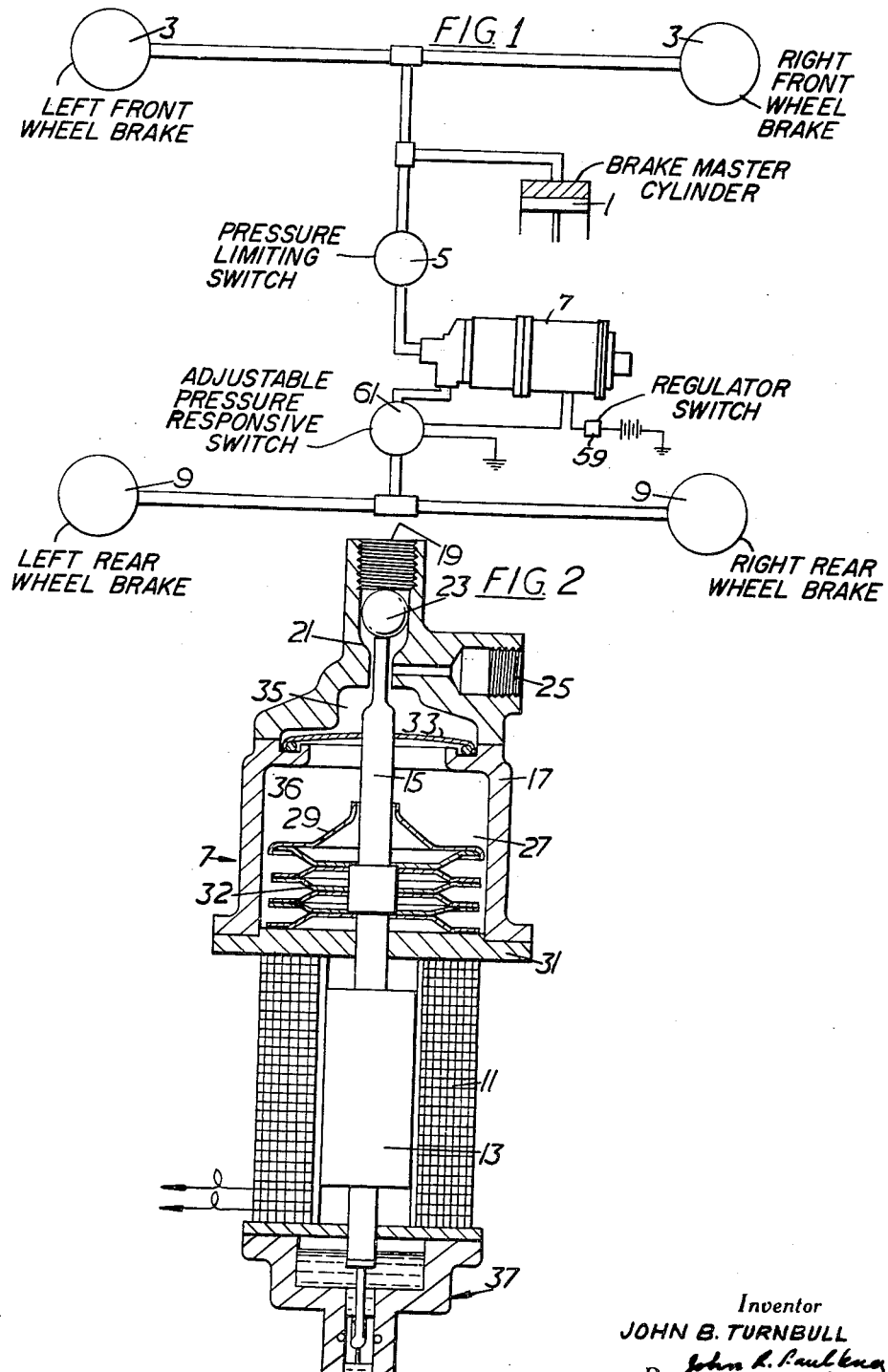

United States Patent Office 3,231,315
Patented Jan. 25, 1966

3,231,315
ANTI-SKID BRAKING SYSTEM
John B. Turnbull, Kenilworth, England, assignor to Ford Motor Company, Dearborn, Mich., a corporation of Delaware
Filed Feb. 3, 1964, Ser. No. 341,912
Claims priority, application Great Britain, Feb. 7, 1963, 4,951/63
2 Claims. (Cl. 303—61)

This invention relates to motor vehicle brake systems.

In a brake system according to the present invention a member, preferably a diaphragm, in the hydraulic system between a brake master cylinder and a brake is electrically oscillatable between a brake release position and a normal position to increase and reduce, respectively, the volume of the system. Since the volume of the hydraulic system is increased when the member moves to the brake release position, the pressure in the hydraulic system is reduced and the brake is consequently released.

Thus, in operation the brakes are applied and released, and the frequency of these operations is preferably fairly high, for example, about five oscillations a second. The application and release of the brakes reduce or practically eliminate skidding and, as a result, improve braking performance.

The member may be electrically oscillatable by operation of a switch responsive to a certain pressure in the hydraulic system. The pressure is preferably such that under the prevailing road conditions the brakes would be just about to lock the wheels, and the wheels would skid. Since road conditions vary considerably from dry ice-free roads to ice-covered roads, the switch is preferably readily adjustable by the driver or automatically, for example, by moisture or ice on the roads, to suit the prevailing road conditions.

Alternatively, the member may be electrically oscillatable by a switch responsive to locking of a braked wheel. For example, centrifugal force may hold the switch open when a wheel is rotating, and a spring may close the switch when the wheel is locked.

Preferably the switch (that is, either the switch responsive to pressure or the locking of a braked wheel) is in series with a regulator which supplies current to the switch only when the generator driven by the engine of the vehicle is charging the battery.

Preferably the member is a flexible diaphragm; a valve is interposed between the brake master cylinder and the diaphragm; and when the diaphragm is in the normal and brake release positions the valve member of the valve is held clear of and engages its seat, respectively. Thus, when the diaphragm is in its release position the master cylinder is isolated from the brakes by the valve with the result that increased pressure in the system upstream of the valve caused by further application of the brake pedal will not affect the reduction in pressure downstream of the valve caused by movement of the diaphragm.

The invention is hereinafter particularly described with reference to the accompanying drawings in which:

FIG. 1 is a diagrammatic view of the hydraulic system of a brake system according to this invention;

FIG. 2 is a section through a device of the brake system;

FIG. 3 is a section through a switch of the brake system; and

FIG. 4 is a diagrammatic electrical circuit of the brake system.

The hydraulic system (FIG. 1) comprises a conventional master cylinder 1 connected to front brakes 3, and through a cutoff valve 5 and a device 7, to rear brakes 9.

The front and rear brakes may be any kind of hydraulically operated brakes.

The cutoff valve 5 prevents the rear brake line pressure from rising above a certain value.

The device 7 (FIG. 2) comprises a solenoid 11, an armature 13 movable downwardly when the solenoid is energised, and a rod 15 fixed to the armature and projecting into a casing 17. The casing has an inlet 19 from the cutoff valve 5, a valve seat 21 for a ball 23, an outlet 25 to the rear brakes downstream of the valve seat 21, and a chamber 27. The rod 15 projects through the chamber 27 and engages the ball 23. A washer 29 is fixed to the rod 15, and a stack of Belleville spring washers 32 is compressed between the washer 29 and a plate 31 to force the rod 15 upwardly to hold the ball 23 off its seat. Also fixed to the rod 15 is a sealing diaphragm 33 which divides the chamber 27 into an upper part 35 which is filled with brake liquid and a lower part 27 which contains the washers 32.

When the solenoid 11 is energised the armature 13 and rod 15 are moved downwardly to permit the pressure in the brake cylinder 1 to force the ball 23 onto its valve seat 21, and to flex the diaphragm 33 downwardly to increase the volume of the upper part 35 of the chamber; the increase in volume releases the pressure in the hydraulic system between the outlet 25 and the rear brakes and consequently causes release of the rear brakes. When the solenoid is de-energised, the Belleville washers 32 move the rod 15 upwardly to force the ball 23 off its valve seat and so to reconnect the inlet 19 and outlet 25; this results in reapplication of the brakes provided, of course, that there is still pressure in the master cylinder.

As described later, the solenoid may in operation be energised and deenergised at a fairly high frequency. In order to control the frequency of oscillation of the armature 13 and hence of the application and release of the brakes, a damper unit 37 is fitted below the solenoid. The damper unit and Belleville washers are such that the armature oscillates at the rate of five oscillations per second.

The solenoid 11 is energised and deenergised by means of the circuit shown in FIGURE 4. The solenoid is connected in series with two switches 57 and a conventional regulator 59 which supplies current to the switches and solenoid only when the generator driven by the engine of the vehicle is charging the battery (a pressure switch 61 is an alternative to the switches 57, and its function is described below). Thus, when the engine is idling, the solenoid is never energised. The switch 57 are such that they close the circuit through the solenoid whenever a wheel is locked by a brake and skids.

The switches 57 are shown in FIGURE 3. Each switch includes a contact sleeve 63 slidable on, but rotatable with a half shaft 65 of a rear axle, a spring 67 biassing the sleeve 63 axially into contact with a fixed contact 69 on the axle casing 71, and balls 72 rotatable by the half-shaft 65 and movable outwardly by centrifugal force to engage a cam surface 73 on the sleeve 63. When the balls 72 engage the cam surface 73, they force the contact sleeve 63 to the left away from the fixed contact 69 to open the switch; this is the normal position of both switches when the vehicle is travelling. However, if one of the rear wheels skids, the half-shaft ceases rotating with the result that the spring 67 is able to force the sleeve 63 to the right into contact with the fixed contact 69, the cam surface 73 forcing the balls 72 radially inwards. The circuit through the solenoid 11 is now closed provided, of course, that the generator is supplying current to the battery.

When one of the switches 57 is closed, the solenoid is energised and draws the rod 15 and diaphragm 33 downwardly to increase the volume of the hydraulic system downstream of the ball valve 23; this releases the brakes. The rear wheels start rotating again, and the closed switch 57 is reopened; the solenoid is deenergised and the rod 15 and diaphragm 33 return to their normal positions. The rear brakes are consequently reapplied. As long as the rear wheels skid when the brakes are applied, the sequence of operation described above is repeated at a frequency of about five oscillations per second.

This rapid application and release of the brakes when the wheels are locked minimizes skidding and improves the braking power of the brakes under slippery road conditions.

The switches 57 may be replaced by the pressure switch 61 shown in FIGURES 1 and 4; in other words, either the pressure switch 61 or the switches 57 are fitted, there is no need to fit both. The pressure switch 61 is designed to close at a certain pressure in the hydraulic system when it is closed, it energises the solenoid 11 and the brake system operates in the same manner as described with reference to the switches 57. The pressure at which the pressure switch 61 energises the solenoid is readily adjustable in accordance with road conditions; for example, on a dry summer day the switch would be adjusted to energise the solenoid when the pressure in the hydraulic system is considerably higher than when the roads are covered with ice.

What is claimed is:

1. A motor vehicle hydraulic brake system having a fluid pressure source, a hydraulic wheel brake and a conduit connecting said source and said brake, hydraulic fluid in said system, a control device interposed in said conduit, said device having means for causing a series of pressure impulses in said hydraulic fluid, said means including a member oscillatable between a fluid pressure increasing and a fluid pressure reducing position, electrical means for oscillating said member between said positions, means damping the movement of said member, a valve interposed in a conduit between said pressure source and said device, means connected to said member for opening and closing said valve, said valve being held in a normally open position when said member is in a pressure increasing position, an adjustable fluid pressure switch interposed in said conduit between said device and said wheel brake, means connecting said switch to said electrical means and constructed to activate said electrical means in response to the closing of said switch, said switch being responsive to the fluid pressure in said conduit and constructed to close its electrical contacts when said pressure reaches a preestablished minimum.

2. A motor vehicle hydraulic brake system having a fluid pressure source, a hydraulic wheel brake and a conduit connecting said source and said brake, hydraulic fluid in said system, a control device interposed in said conduit, said device having means for causing a series of pressure impulses in said hydraulic fluid, said means including a member oscillatable between a fluid pressure increasing and a fluid pressure reducing position, electrical means for oscillating said member between said positions, a valve interposed in said conduit between said pressure source and said control device, said valve being held in a normally open position when said member is in a pressure increasing position, an adjustable fluid pressure switch interposed in said conduit between said device and said wheel brake, means connecting said switch to said electrical means and constructed to activate said electrical means in response to the closing of said switch, said switch being responsive to the fluid pressure in said conduit and constructed to close its electrical contacts when said pressure reaches a preestablished minimum.

References Cited by the Examiner

UNITED STATES PATENTS

| | | | |
|---|---|---|---|
| 2,907,607 | 10/1959 | Williams | 303—21 |
| 2,959,012 | 11/1960 | Johnson | 303—61 |
| 3,030,464 | 4/1962 | Zeigler | 303—24 |
| 3,089,734 | 5/1963 | Jankus | 303—61 |
| 3,098,635 | 7/1963 | Delaporte et al. | 251—54 |
| 3,108,777 | 10/1963 | Ray | 251—54 |

FOREIGN PATENTS 46,753 6/1936 France.
(2nd Addition to No. 783,477)

A. HARRY LEVY, *Primary Examiner.*

EUGENE G. BOTZ, BENJAMIN HERSH, *Examiners.*